UNITED STATES PATENT OFFICE.

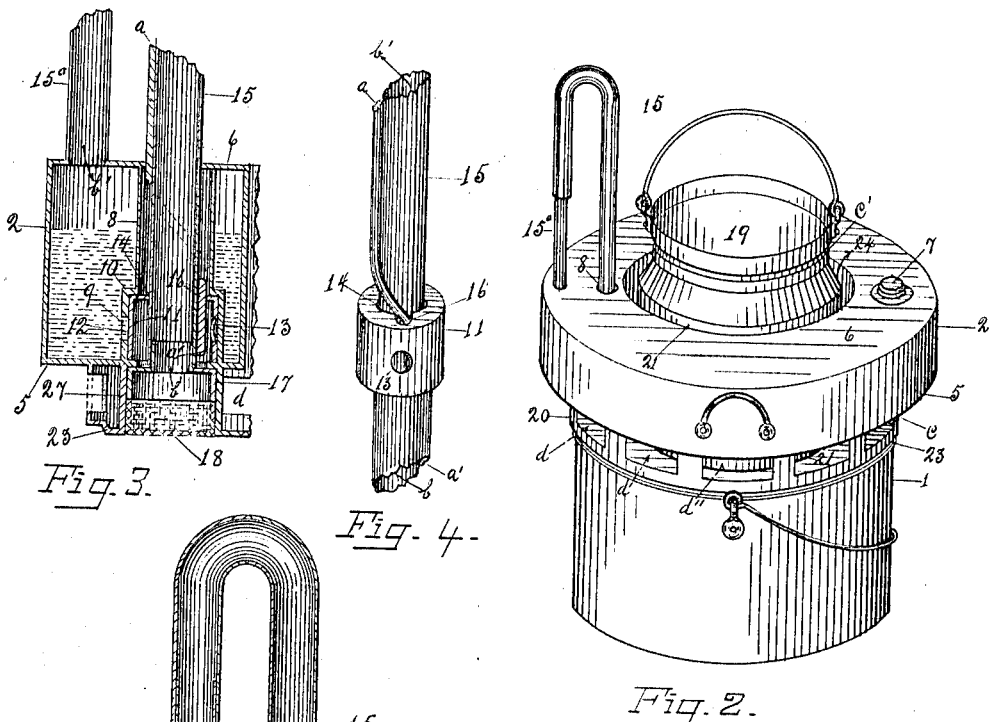

FRENCH NESTOR, OF ELKINS, WEST VIRGINIA.

COOKING UTENSIL.

1,061,555. Specification of Letters Patent. Patented May 13, 1913.

Application filed January 30, 1909. Serial No. 475,088.

*To all whom it may concern:*

Be it known that I, FRENCH NESTOR, a citizen of the United States, and resident of Elkins, in the county of Randolph and State of West Virginia, have invented an Improved Cooking Utensil, of which the following is a full, clear, and exact description.

This invention relates to improvements in cooking vessels; particularly to kettles, cook-pots, coffee and tea boilers, etc.

The objects are, to provide new and improved means for automatically maintaining the level of liquid in the cooking or boiling vessel constant; to reduce evaporation; to condense the vapors from the contents of the vessel and return the condensed liquid thereto, thus retaining richness and flavor otherwise lost.

The specific manner in which the foregoing and other new and novel features are attained will appear from the reading of this specification with reference to the accompanying drawings, forming part hereof, in which similar characters of reference indicate corresponding parts in all the figures.

Figure 1 is a central vertical section through an embodiment of my invention as applied to an ordinary cook-pot, and best illustrates the means by which a practically constant level of liquid is maintained within the vessel. Fig. 2 is a reduced perspective view of the same, looking in the same direction as in Fig. 1. Fig. 3 is a detail sectional view, showing the valve in the closed position. Fig. 4 is a detail perspective view, showing the construction of the inner valve-member and the means for opening and closing the valve.

My invention comprises a cooking vessel of the kind referred to, and may be of any convenient shape. The shape here illustrated is a cylindrical vessel 1, and a cylindrical reservoir 2, seated thereon.

The reservoir 2, as best shown in Fig. 1, is composed of an outer cylindrical wall 3, and an inner concentric cylindrical wall 4, having a bottom 5, and an air-tight top 6, fitted with a screw-cap 7, for filling, providing an annular space between the cylinders adapted to receive and contain the liquid to be automatically fed to the vessel below. The tube 8, open throughout its length, is passed vertically through the said annular space, is joined to the inner surfaces of the bottom 5 and top 6, around circular openings therein, of slightly smaller diameter than the respective ends of said tube 8, is water-tight except at the circular opening 9, and is enlarged at 10 to form the outer member of the valve 12, and to receive the inverted cylindrical cup 11, which forms the inner and movable member of said valve, and has in its side wall a circular opening 13, exactly corresponding to opening 9 in tube 8, and in its top a larger circular opening 14, to slidably receive air-tube 15, and slotted outwardly at 16 to receive the bent wire *a a'*, which is soldered to the surface of tube 15 as best shown in Fig. 4, and serves to laterally turn the valve-cup 11, opening the valve 12 when the tube 15 is lowered into the vessel as shown in Fig. 1, and closing it when said tube is elevated as shown in Fig. 3. The air-tube 15, which has an enlarged mouth 17, fitted with a downwardly projecting screen cap 18 to prevent solid substances obstructing the air-passage *b b'*, is passed vertically through tube 8 and valve-cup 11, extending upward above the reservoir 2, and turning downward by an inverted U-shaped curve, fits tightly over its tubular stem $15^a$, providing a continuous air-passage *b b'* from the vessel 1 to the top of the reservoir 2, and frictionably holding itself, by engagement with said stem $15^a$, at any desired elevation.

In Fig. 3, the valve 12 is shown closed, the tube 15 being in the elevated position, and the opening 13 in valve-cup 11 being thrown, by means of the wire *a a'* and the slot 16, to that side of tube 8 directly opposite the opening 9 therein, which is closed by the solid wall of valve-cup 11. If the tube 15 be now lowered as in Fig. 1, it will be seen that the two openings 9 and 13 have been brought directly in line, providing a passage (valve 12) through which liquid may flow from the reservoir 2 to the interior of tube 8 and thence to the vessel 1; but the mouth 17 of tube 15 being at the same time submerged in the liquid in said vessel 1, the air-inlet *b b'* is closed, causing the formation of a partial vacuum in the top of the reservoir 2, suctionally arresting and preventing further flow of liquid through the valve 12 until the level of liquid in vessel 1 sinks below the mouth 17, when the entrance of air through the passage *b b'* destroys the partial vacuum, releasing the liquid which flows through the valve 12 until arrested as before by the submersion of mouth 17 in the rising liquid in vessel 1. It may be seen that as often as the level of liquid in the vessel 1 sinks below the mouth 17 of tube 15, there will be an immediate flow of liquid from the reservoir 2, just sufficient to again submerge said mouth and arrest the flow of liquid, thus operating to maintain a practically constant level of liquid in the vessel 1, which level may be predetermined by slidably adjusting the tube 15 to the desired point.

This device reduces evaporation to a minimum, primarily in the decreased amount of liquid necessary to be kept in a heated state, the removal of all danger of scorching or burning obviating the necessity for using more than merely sufficient liquid to moisten the article to be cooked, which condition also lessens consumption of fuel, necessary heat decreasing in direct proportion to the total of liquid to be heated.

To prevent the liquid in the reservoir 2 from becoming heated, in which case consequent expansive pressure therein would overcome the necessary vacuum; to secure the maximum condensation of vapors arising from vessel 1; to support the reservoir 2 in a position elevated from the vessel 1, and to centrally support an in-set vessel 19, I provide a ventilator, composed of an outer cylindrical wall 20, and an inner concentric cylindrical wall 21, connected by a bottom 22. The outer wall 20 is liberally ventilated with rectangular openings $d\ d'\ d''$; is joined to the bottom 5 of reservoir 2 at $c$, extending downward to the bottom 22, which bottom is reduced at 23 to provide a shoulder for engagement with the top rim of vessel 1. The inner cylinder 21, extending upward centrally of the main opening through the reservoir 2, is of sufficiently smaller diameter than wall 4 thereof, to provide therebetween the open annular air-space 24, ventilated from outside the vessel through the rectangular openings $d\ d'\ d''$. This cylinder is reduced in diameter at its top $c'$ to loosely receive the in-set vessel 19 or lid 26, and provides an inclosed steam-space 25, the wall 21 thereof cooled by constant contact with an air-current passing through the air-space 24, and providing a condensing surface for condensing the vapors from the vessel 1. Cylinder 27 furnishes a continuation of tube 8, and is adapted to receive the mouth 17 and its screen-cap 18, when the tube 15 is elevated as shown in Fig. 3.

From the foregoing description of the various parts and their functions, the operation of the device may be readily understood. The vessel 1, partly filled with liquid, is used as the cooking or boiling vessel. The reservoir 2, with the valve 12 closed as shown in Fig. 3, is filled with liquid, closed by the screw-cap 7, and placed in position as in Fig. 1. The in-set vessel 19 or lid 26 is used to loosely close the cylinder 21, the tube 15 is pushed downward, simultaneously opening the valve 12, and slightly submerging the mouth 17 in the liquid in the vessel 1. It has been shown how the liquid in the vessel 1 will now be automatically maintained at a practically constant level until all liquid has been drawn from the reservoir 2.

The elevated position of the reservoir 2, and the interposition of a constantly moving strata of fresh air with its two bordering metal walls 3 and 21 between the interior of the vessel 1 and the contents of the reservoir 2, amply protect the latter from excessive heat, thus preventing the creation of any expansive pressure therein, and consequent interference with the automatic feeding of liquid therefrom.

The invention as shown and described, although being my preferred form of construction, may obviously be materially modified within the scope of the invention, as defined in the annexed claims.

Having thus illustrated and described my invention, I claim as new, and desire to secure by Letters Patent:—

1. In a cooking utensil, the combination of a lower vessel, a superposed hermetically sealed supply reservoir, a liquid outlet communication between the reservoir and vessel, a tube having its lower end in communication with the vessel and its upper end in communication with the reservoir, the lower end of the tube adapted to contact normally with the liquid in the vessel and vertically adjustable for regulating and controlling the supply of liquid from the reservoir to the vessel.

2. In a cooking utensil, the combination of a vessel, a superposed hermetically sealed supply reservoir, the reservoir having a communication with the vessel, a valve controlling said communication, a vertically adjustable tube having its lower end within the vessel and its upper end communicating with the reservoir for regulating and controlling the supply of liquid from the reservoir to the vessel and operative means communicating with the tube and said valve, whereby the valve may be opened and closed by the movement of the tube for opening and closing the said communication.

3. In a cooking utensil, the combination of a lower vessel, a superposed hermetically sealed supply reservoir having a communication with the vessel, a valve controlling the said communication, a vertically adjustable tube having its lower end within the vessel and adapted to contact normally with the liquid therein, the upper end of the tube communicating with the reservoir, the valve having a short vertical slot and the tube a relatively long spiral rib entering said slot, whereby the valve is operated by the vertical movement of the tube during the engagement of the spiral rib and slot, and the tube movable above said engagement and without operating said valve, the parts combined for the purpose described.

In testimony whereof I have signed my name to this specification in the presence of two subscribing witnesses.

FRENCH NESTOR.

Witnesses:
L. T. FEASTER,
W. F. EVANS.

Copies of this patent may be obtained for five cents each, by addressing the "Commissioner of Patents, Washington, D. C."